(12) United States Patent
Paryani et al.

(10) Patent No.: US 8,638,063 B2
(45) Date of Patent: Jan. 28, 2014

(54) AC CURRENT CONTROL OF MOBILE BATTERY CHARGERS

(75) Inventors: Anil Paryani, Cerritos, CA (US); Troy A. Nergaard, San Francisco, CA (US); Andrew Baglino, San Francisco, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 419 days.

(21) Appl. No.: 12/903,388

(22) Filed: Oct. 13, 2010

(65) Prior Publication Data

US 2012/0091953 A1    Apr. 19, 2012

(51) Int. Cl.
*H02J 7/00* (2006.01)
(52) U.S. Cl.
USPC .......................................... 320/109; 320/115
(58) Field of Classification Search
USPC .......................................... 320/104, 109, 115
See application file for complete search history.

(56) References Cited

U.S. PATENT DOCUMENTS

| | | | | |
|---|---|---|---|---|
| 5,596,258 | A * | 1/1997 | Kimura et al. | 320/163 |
| 6,144,187 | A * | 11/2000 | Bryson | 320/137 |
| 7,683,570 | B2 | 3/2010 | Krauer et al. | |
| 7,750,604 | B2 | 7/2010 | Hartular et al. | |
| 2008/0197811 | A1 | 8/2008 | Hartular et al. | |
| 2009/0020346 | A1 * | 1/2009 | Krauer et al. | 180/65.2 |
| 2009/0039837 | A1 * | 2/2009 | Suzuki | 320/152 |
| 2009/0243538 | A1 * | 10/2009 | Kelty et al. | 320/104 |
| 2011/0043160 | A1 | 2/2011 | Serban | |

FOREIGN PATENT DOCUMENTS

JP     2008259372 A    10/2008

OTHER PUBLICATIONS

European Search Report for application 11 008 283.1, issued Dec. 6, 2012.
European Search Report for application 13 15 2890, issued Mar. 22, 2013.
Office action in Japanese patent application 2011-221759, issued Mar. 5, 2013.

* cited by examiner

*Primary Examiner* — Samuel Berhanu
(74) *Attorney, Agent, or Firm* — J. Richard Soderberg

(57) ABSTRACT

A charging system and method that improves utilization of available AC power during onboard charging of energy storage systems of electric vehicles. An onboard charging method for an energy storage system of an electric vehicle, the method using an AC power source, includes a) establishing a maximum DC charging current for the energy storage system responsive to a control signal indicating real-time available current/power from the AC source; and b) controlling a charging system to provide an actual DC charging current, up to the maximum DC charging current, to the energy storage system.

20 Claims, 2 Drawing Sheets

AC CURRENT CONTROL OF MOBILE BATTERY CHARGERS

BACKGROUND OF THE INVENTION

The present invention relates generally to onboard charging systems for primary energy storage systems of electric vehicles (EVs), and more specifically to AC current control of such onboard chargers.

Conventional onboard chargers in EVs and other vehicles (e.g., forklifts, boats and the like) and other mobile energy storage installation charged via a battery charger that is plugged into a wall outlet use DC current requests to regulate charging of the battery cells. Such chargers do not use all available AC wall power which is central to the drawbacks of the conventional charging paradigm.

It is one goal of embodiments of the present invention to remove an associated DC efficiency of charging controllers when converting the AC wall power to DC charging current. The particular value for the efficiency is usually not measured for each charging system which can help to reduce costs and complexity. Conventional systems typically therefore assume a DC efficiency for each model and use of a charging system. For each charging system, the actual DC efficiency will likely be greater than the assumed efficiency but may be less in some cases. When the actual DC efficiency is less than the assumed efficiency, there is a risk that the charger will draw too large an AC current during charging in the absence of AC current limiting circuitry. Depending upon many factors, consequences of drawing too large an AC circuit include, when not properly protected, tripping an AC current breaker and increasing a fire risk, among other concerns. When the actual DC efficiency is greater than the assumed efficiency, adverse consequences are reduced but time to charge is needlessly increased for the overall charging.

To reduce these risks, the assumed DC efficiency is conservative as compared to the inherent manufacturing variation of the charging systems. The larger a disparity between any given charging system's actual DC efficiency and the assumed efficiency, the greater the drawback of these conventional systems.

The drawbacks of being conservative with the assumed DC efficiency are several-fold. For one, charging the battery with a conservative charging system means that, over the same period for a charging system that more accurately reflects the actual DC efficiency, fewer Amp-hours are provided to the battery. This will mean that the charging time must be increased to achieve the same state of charge (SOC) or the SOC will be less for the same period. For example, it could be that over an eight hour charging cycle at twenty amperes, that a conservative charging profile results in four fewer Amp-hours. This could translate to 5 fewer driving miles or 15 extra minutes of charge time.

Further, the more conservative the assumption of the DC efficiency, the more inefficient is the entire charging cycle. Part of the reason for this is that there is an energy "tax" associated with charging. Namely, there are pumps and regulators and other fixed auxiliary loads that are operated during charging. The longer that charging takes, the longer this tax is applied which reduces charging efficiency. Typically these auxiliary loads are constant, perhaps around 500 W. EV charge times typically are between 4 hours and 48 hours, but do vary and longer and shorter times are possible. In the 48-hour case, when a charger is using only 90% of the wall power, the charging process could use a couple of kW-hour more since charge time could be extended by 4 hours (1.1*48 hours). Therefore, not utilizing full wall power decreases overall system efficiency.

Some conventional system may employ a DC current sensor in the charging system in attempts to address this problem by closing a regulation loop but this adds costs. In other systems, a Battery Management System (BMS) may use a DC current sensor but delays in communicating sensing current from the BMS to the charger increases a risk of control loop instability.

What is needed is a charging system that improves utilization of available AC power during onboard charging of energy storage systems of electric vehicles.

BRIEF SUMMARY OF THE INVENTION

Disclosed is a charging system and method that improves utilization of available AC power during onboard charging of energy storage systems of electric vehicles. An onboard charging method for an energy storage system of an electric vehicle, the method using an AC power source, includes a) establishing a maximum DC charging current for the energy storage system responsive to a control signal indicating real-time available current/power from the AC source; and b) controlling a charging system to provide an actual DC charging current, up to the maximum DC charging current, to the energy storage system.

An onboard charging method for an energy storage system of an electric vehicle, the method using an AC power source, includes a) evaluating a first process control loop to set a reference DC current responsive to a difference between a DC target voltage for the energy storage system and a voltage feedback for the energy storage system, the first process control loop setting the reference DC current at a value ranging between a target discharging current and a target charging current for the energy storage system; and b) evaluating a second process control loop to set a control signal responsive to a difference between the reference DC current and a generated DC current provided to the energy storage system for charging, the second process control loop setting the control signal at a value ranging between a maximum DC discharging current and a maximum DC charging current derived from an available real-time AC current, power, or what is appropriate for the battery; and c) controlling a charger onboard the electric vehicle responsive to the control signal to produce DC current.

An electronic system for charging an energy storage system of an electric vehicle with charging using an AC power source, includes an energy access system, coupled to the AC energy source, producing an input AC current/AC power; a charger, coupled to the energy access system, for producing an actual DC charging current responsive to a control signal; a controller configured to adjust the actual DC charging current based upon a maximum for the input AC current/AC power and a difference between a target DC charging current and the actual DC charging current.

An electronic system for charging an energy storage system of an electric vehicle using an AC power source, includes an energy access system, coupled to the AC energy source, producing an input AC current/AC power; a charger, coupled to the energy access system, for producing an actual DC charging current responsive to a control signal from the input AC current/AC power; a voltage sensor that measures a voltage level of the energy storage system; a current sensor that measures a magnitude of the actual DC charging current applied to charging the energy storage system; and a controller, coupled to the current sensor, wherein the controller is configured to adjust the actual DC charging current based upon a maximum for the input AC current/AC power, a difference between the voltage level, and a preset maximum voltage level target of the energy storage system, and a difference between a target DC charging current and the actual DC charging current.

Some advantages from the present invention follow from control of AC input current rather than output DC current of an onboard battery charger. These advantages may include, depending upon particular implementations and embodiments, full utilization of available wall power, which reduces battery charge time and costs, and may increase efficiency in high power applications such as EVs. (The built-in margin required of conventional DC regulation systems is not required as it is not possible to exceed available AC current or AC power.) Other advantages include a potential for reduced system costs as the charging system does not employ a redundant DC current sensor (that may be implemented in some conventional systems) to close a regulation loop, and system efficiency is increased for those systems having fixed auxiliary loads. Shortening charging time from using all available AC power reduces the amount of the built-in energy "tax" that results from operating the auxiliary loads during charging. Further, embodiments of the present invention reduce control complexity by not needing to estimate and feed forward power consumption of all various non-battery loads during charge. The preferred embodiments of the present invention implement a single feedback control from a charge "master" to a source of power. Other features, benefits, and advantages of the present invention will be apparent upon a review of the present disclosure, including the specification, drawings, and claims.

DETAILED DESCRIPTION OF THE INVENTION

Embodiments of the present invention provide methods and systems for a charging system that improves utilization of available AC power during onboard charging of energy storage systems of electric vehicles. The following description is presented to enable one of ordinary skill in the art to make and use the invention and is provided in the context of a patent application and its requirements. In the following text, the terms "energy storage system", "energy storage assembly", "battery", "cell", "brick", "battery cell", "battery cell pack", "pack" "electric double-layer capacitor", and "ultracapacitor" may be used interchangeably (unless the context indicates otherwise" and may refer to any of a variety of different rechargeable configurations and cell chemistries described herein including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other chargeable high energy storage type/configuration. A context for one implementation is use of rechargeable Li-ion battery packs designed for plug-in electric vehicles (PHEV, HEV, and EV and the like).

Figure 1:
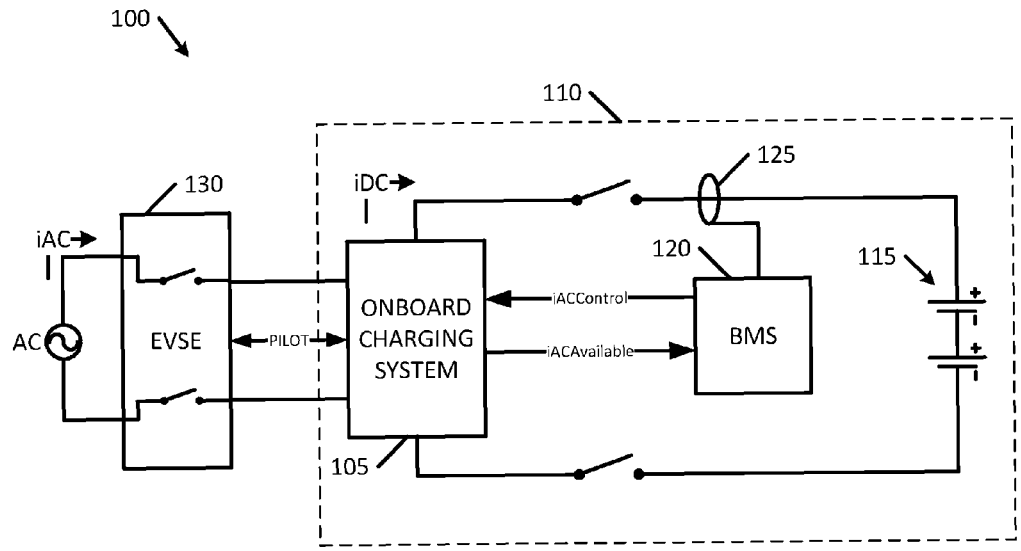
FIG. 1 is a general schematic block diagram of an AC current-controlled charging system.

FIG. 1 is a general schematic block diagram of an AC current-controlled charging system 100. System 100 includes an onboard charging system 105 (e.g., onboard an electric vehicle 110) for charging an energy storage system 115 of vehicle 110. A battery management system (BMS) 120 is coupled to charging system 105 and to a DC current sensor 125 to control charging of energy storage system 115. Sensor 125 measures actual DC charging current provided to energy storage system 115 from charging system 105. BMS 120 provides a control signal (iACControl) to charging system 105 and charging system 105 provides an iACAvailable signal to BMS 120.

Charging system 105 uses power from an off-board AC power source 130. Preferably source 130 includes an electric vehicle supply equipment (EVSE) that implements an SAEJ1772-2009 standard, hereby expressly incorporated by reference for all purposes. This standard includes specification for a power connector that is designed for single phase electrical systems with 120 V or 240 V. This power connector includes five pins: AC line 1 and AC line 2/Neutral power pins, ground pin, proximity detection pin, and control pilot pin. Preferred embodiments of the present invention use the control pilot pin which is a communication line that coordinates charging level between an EV and charger. Other control pilot signaling protocols are possible and embodiments of the present invention may be configured for operation with these control pilot signaling protocols as well.

J1772 specifies that the control pilot signal will: verify that the vehicle is present and connected; transmit supply equipment current rating to the vehicle; allow energizing and de-energizing of the AC power source; and establish vehicle ventilation requirements. The transmission of supply equipment current rating is a parameter used in the embodiments of the present invention.

Figure 2:
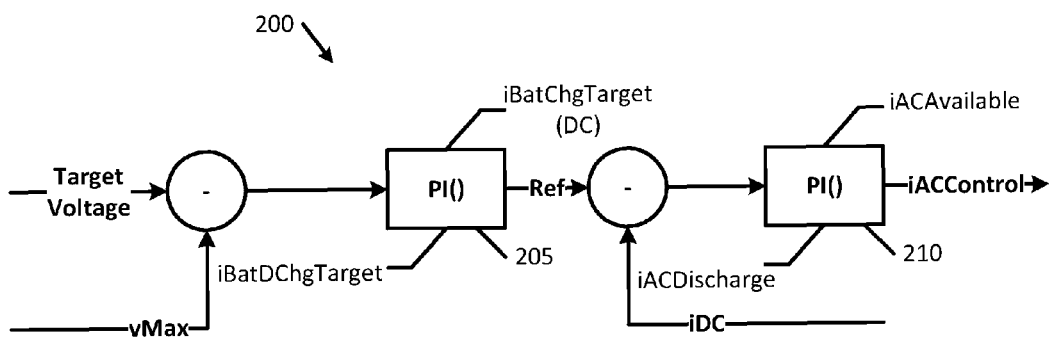
FIG. 2 is a representative control process used in the system shown in FIG. 1.

FIG. 2 is a representative control process 200 used in system 100 shown in FIG. 1. Process 200, includes a first control loop feedback mechanism 205 and a second control loop feedback mechanism 210. These mechanisms are represented herein as proportional-integral (PI) controllers, though other controllers could be used as well (e.g., proportional-integral-derivative (PID) controllers and other controllers). First feedback mechanism 205 uses a difference between a target voltage for energy storage system 115 and a maximum voltage (feedback) to determine a reference current. The reference current ranges between a maximum DC discharge current (iBatDChgTarget) and a DC charging target current (iBatChgTarget). The measured voltage may be of a cell, a brick, a module, a pack or other unit of energy storage system 115.

This reference current is provided to second feedback mechanism 210. Second feedback mechanism 210 compares the reference current to the actual DC charging current provided to energy storage system 115 (as measured by sensor 125) to establish a control signal that is a command AC control request (line current or line power) provided to charging system 105. The control signal ranges from a maximum AC discharge current (iACDischarge) to an AC available current (iACAvaialable) as determined from the pilot signal from AC power source 130. Process 200 is a generalized description that contemplates not only charging of the battery from an electrical grid in a first operational mode, but also contemplates discharging the battery into the electrical grid in a second operational mode. For systems operating only in the first operational mode, the design may be simplified by setting the discharge parameters (i.e., iBatDChgTarget and iAC- Discharge) to zero. In the second operational mode, the discharge parameters are negative values to reflect flow from the energy storage system.

As noted above in the discussion of the two feedback mechanisms, there is a maximum DC discharge current as a lower limit for currents in process 200. In many implementations, this current may be zero Amps. In other cases, it will be an actual discharge current to provide for drawing energy from energy storage system 115 to permit such smart EVs to help power devices using grid power. Energy may be drawn from energy storage system 115 to help power devices and processes outside of EV 110. Process 200 may be configured as described herein to handle either contingency.

Figure 3:
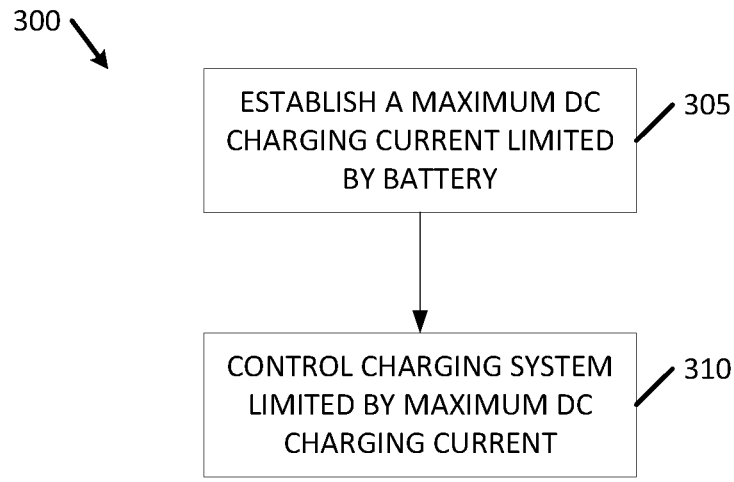
FIG. 3 is a flowchart of an AC current-controlled charging method.

FIG. 3 is a flowchart of an AC current-controlled charging method 300. Method 300 includes two steps, a DC charging current establishing step 305 followed by a charging system controlling step 310. Step 305 establishes a maximum DC charging current limited by the battery system. This is the AC current control setup step and permits charging system 105 shown in FIG. 1 to use all available AC power. Step 310 controls charging system 105 with the appropriate DC charging current at the appropriate voltage level as established in step 305. The actual DC charging current is limited by the maximum DC charging current.

Figure 4:
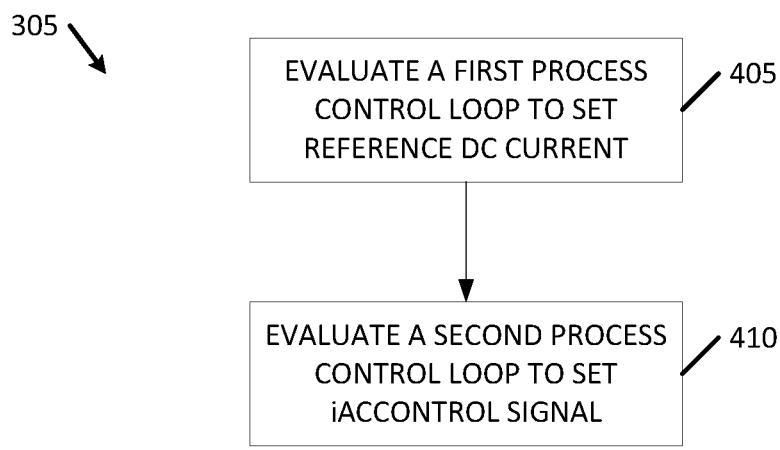
FIG. 4 is a flowchart of the charging current establishing step shown in FIG. 3.

FIG. 4 is a flowchart of the charging current establishing step 305 shown in FIG. 3. Step 305 includes a first feedback loop evaluation step 405 and a second feedback loop evaluation step 410, these steps corresponding to operation of the first feedback mechanism 205 and the second feedback mechanism, respectively. Step 405 evaluates the first feedback mechanism to set the DC reference current. Step 410 evaluates the second feedback mechanism to set the charging control signal provided to charging system 105.

The system and methods above have been described in the preferred embodiment of a charging system that improves utilization of available AC power during onboard charging of energy storage systems of electric vehicles. As noted above, conventional charging systems have used DC regulation because batteries have current limits based upon voltage, SOC, and temperature. By using the embodiments of the present invention disclosed herein, actual DC charging currents are linked to available AC power. Because batteries want to be charged with a DC current, conventional EV charging systems do not use AC current availability. The embodiments of the present invention connect the energy storage system to the AC power, improving charging operation. For ease of understanding and simplification of discussion, the embodiments of the present invention have focused on implementation using lithium metal oxide technology in the energy storage unit. It is possible to adapt the present invention to other battery technologies. In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. An onboard charging method for an energy storage system of an electric vehicle, the method using an AC power source, the method comprising the steps of:
   a) evaluating a first process control loop to set a reference DC current responsive to a difference between a DC target voltage for the energy storage system and a voltage feedback for the energy storage system, said first process control loop setting said reference DC current at a value ranging between a target discharging current and a target charging current for the energy storage system; and b) evaluating a second process control loop to set a control signal responsive to a difference between said reference DC current and a generated DC current provided to the energy storage system for charging, said second process control loop setting said control signal at a value ranging between a maximum DC discharging current and a maximum DC charging current derived from an available real-time AC current; and c) controlling a charger onboard the electric vehicle responsive to said control signal to produce said generated DC current.

2. The method of claim 1, wherein the energy storage system comprises Lithium metal oxide technology.

3. The method of claim 1, wherein at least one of the first and second process control loops comprises a proportional-integral controller.

4. The method of claim 1, further comprising setting the maximum DC discharging current to zero Amperes.

5. The method of claim 1, further comprising setting the maximum DC discharging current to an actual discharge current.

6. The method of claim 1, wherein evaluating the first and second process control loops comprises a first operational mode for charging the energy storage system, the method further comprising operating the energy storage system in a second operational mode.

7. The method of claim 6, wherein the second operational mode comprises discharging the energy storage system into an electrical grid.

8. The method of claim 7, further comprising, after operating the energy storage system in the second operational mode, setting discharge parameters to zero.

9. The method of claim 1, further comprising determining the available real-time AC current from a pilot signal of an AC power source.

10. An onboard charging method for an energy storage system of an electric vehicle, the method using an AC power source, the method comprising the steps of:

a) evaluating a first process control loop to set a reference DC current responsive to a difference between a DC target voltage for the energy storage system and a maximum DC voltage for the energy storage system, said first process control loop setting said reference DC current at a value ranging between a target discharging current and a target charging current for the energy storage system; and b) evaluating a second process control loop to set a control signal responsive to a difference between said reference DC current and a generated DC current provided to the energy storage system for charging, said second process control loop setting said control signal at a value ranging between a maximum DC discharging current and a maximum DC charging current derived from an available real-time AC power; and c) controlling a charger onboard the electric vehicle responsive to said control signal to produce said generated DC current.

11. The method of claim 10, wherein at least one of the first and second process control loops comprises a proportional-integral controller.

12. The method of claim 10, wherein evaluating the first and second process control loops comprises a first operational mode for charging the energy storage system, the method further comprising operating the energy storage system in a second operational mode.

13. The method of claim 12, wherein the second operational mode comprises discharging the energy storage system into an electrical grid.

14. The method of claim 13, further comprising, after operating the energy storage system in the second operational mode, setting discharge parameters to zero.

15. The method of claim 10, further comprising determining the available real-time AC current from a pilot signal of an AC power source.

16. An electronic system for charging an energy storage system of an electric vehicle, comprising:

a first process control loop setting a reference DC current responsive to a difference between a DC target voltage for the energy storage system and a voltage feedback for the energy storage system, said first process control loop setting said reference DC current at a value ranging between a target discharging current and a target charging current for the energy storage system;

a second process control loop setting a control signal responsive to a difference between said reference DC current and a generated DC current provided to the energy storage system for charging, said second process control loop setting said control signal at a value ranging between a maximum DC discharging current and a maximum DC charging current derived from an available real-time AC current; and a charger onboard the electric vehicle producing said generated DC current responsive to said control signal.

17. The electronic system of claim 16, wherein at least one of the first and second process control loops comprises a proportional-integral controller.

18. The electronic system of claim 16, wherein the first and second process control loops comprise a first operational mode for charging the energy storage system, the electronic system further comprising a second operational mode of discharging the energy storage system into an electrical grid.

19. An electronic system for charging an energy storage system of an electric vehicle, comprising:

a first process control loop setting a reference DC current responsive to a difference between a DC target voltage for the energy storage system and a maximum DC voltage for the energy storage system, said first process control loop setting said reference DC current at a value ranging between a target discharging current and a target charging current for the energy storage system;

a second process control loop setting a control signal responsive to a difference between said reference DC current and a generated DC current provided to the energy storage system for charging, said second process control loop setting said control signal at a value ranging between a maximum DC discharging current and a maximum DC charging current derived from an available real-time AC current; and a charger onboard the electric vehicle producing said generated DC current responsive to said control signal.

20. The electronic system of claim 19, wherein at least one of the first and second process control loops comprises a proportional-integral controller.

* * * * *